June 20, 1939.  E. W. CHAFEE ET AL  2,162,698
BOMB SIGHT
Original Filed June 18, 1932  5 Sheets-Sheet 1

INVENTORS
EARL W. CHAFEE and
HUGH MURTAGH
BY
their ATTORNEY.

June 20, 1939.　　　　E. W. CHAFEE ET AL　　　　2,162,698
BOMB SIGHT
Original Filed June 18, 1932　　5 Sheets-Sheet 3

June 20, 1939.  E. W. CHAFEE ET AL  2,162,698
BOMB SIGHT
Original Filed June 18, 1932    5 Sheets-Sheet 4

INVENTORS
EARL W. CHAFEE and
HUGH MURTAGH
BY
their ATTORNEY

June 20, 1939.   E. W. CHAFEE ET AL   2,162,698
BOMB SIGHT
Original Filed June 18, 1932   5 Sheets-Sheet 5

INVENTORS
EARL W. CHAFEE and
HUGH MURTAGH
BY Herbert H. Thompson
ATTORNEY.

Patented June 20, 1939

2,162,698

UNITED STATES PATENT OFFICE 2,162,698

BOMB SIGHT

Earl W. Chafee, New York, and Hugh Murtagh, Brooklyn, N. Y., assignors to Sperry Gyroscope Company, Inc., Brooklyn, N. Y., a corporation of New York Application June 18, 1932, Serial No. 618,080
Renewed January 14, 1938

11 Claims. (Cl. 88—1)

This invention relates to bomb sights for aircraft which are designed to direct the course of the airplane so that its ground track (neglecting offset) passes through the target in a straight line before and at the instant of bomb release, and preferably which also determine the exact point at which the bomb should be released to strike the target. On account of the high efficiency of anti-aircraft gun fire bombing aircrafts are to-day forced to high altitudes (on the order of 20,000 ft.). At such altitudes the effect of wind is very important so that it is necessary that the aviator determine accurately both the ground speed and side drift of the plane and from these factors determine the straight ground track to the target, the correct range angle along that track, and the correct deflection or offset angle in case of side wind. In order that the plane may be brought as quickly as possible upon said straight ground track, we provide a connection between the bomb sight and the steering mechanism of the plane whereby the plane may be turned in accordance with the movements of the bomb sight. Such turning may be effected either through a human agency, that is, through the operation of electrical signals and through the human pilot or automatically as desired, but for simplicity we have shown only the former method of control in this application.

One of the principal objects of this invention is to simplify bomb sights of the above described character so as to reduce the number of parts and eliminate mechanical errors as far as possible. To this end the formulae used in the computing apparatus have been greatly simplified, substantially all variable pitch cams and mechanical differentials eliminated, and the variable speed gears reduced to a minimum.

Another important improvement over the prior art consists in the method of synchronizing ground speed in the instrument. In the prior art, an attempt was made to actually set up the true ground speed in the instrument. On the other hand the actual rate of movement of the sighting prism for a given ground speed is much less at high altitudes than low altitudes. In fact, it is inversely proportional to the altitude. Therefore, devices of the prior art have been very inaccurate at high altitudes owing to the necessity of multiplying prism speed by a function of the altitude because this also multiplied any errors by the same proportion. In our sight, on the other hand, we do not attempt to set up actual ground speed but deal entirely with the horizontal component of the actual rate of movement of the sight so that this value put into the computing unit (and used in lieu of ground speed) is different at all altitudes although the ground speed may be the same. This is made possible in our machine because the calculating mechanism in our bomb sight is based entirely on rates and is independent of actual ground distances and because as we solve the range triangle altitude only enters as a variable in obtaining the average rate of fall of the bomb which varies very slowly with altitude. By this means also, we are enabled to employ one variable speed gear without the assistance of an altitude multiplying unit.

Another improvement accomplished by our invention is a means for determining the drift angle directly from the bomb sight. Other objects and improvements will become apparent as the description proceeds.

Referring to the drawings illustrating several forms the invention may assume.

Our bomb sight may be considered as made up of several units, all cooperating to produce the final result, namely, the optical system, the computing unit, and the pilot directing system, although both the optical system and computing unit are entirely contained in the casing 1. The optical system comprises in general a telescope 2 mounted in the top of casing 1, which, through an optical system (not shown), views an image of the ground appearing on a stabilized reticule 3. Said reticule is preferably the only part of the optical system connected to the stabilizing gyroscope or gyro vertical 4 (Figs. 6 and 8) and is shown as provided with cross hairs 5 and 6 placed fore and aft and transversely, respectively, of the aircraft. Said reticule may also be provided with graduated lines 7 for the purpose of presetting as will be described hereinafter. The ground image is thrown upon the reticule from a prism or other reflector 8 which is preferably pivoted about a transverse axis 9' so that the light of sight may be kept upon a fixed point on the ground as the aircraft approaches, and flies over the same. Said prism is also preferably mounted for turning about a fore and aft axis on the craft so that the proper offset angle may be set up. As to this feature, the invention is similar to the prior patent to Mortimer F. Bates, No. 1,783,769, dated December 2, 1930 on Bomb sights.

As shown, the pivotal transverse shaft 9' on which the mirror is mounted, is journaled in a ring 10, which in turn is mounted for angular adjustment in an outer fixed frame 11. The adjustment of the prism about the transverse axis to follow the target is shown as effected through a rod 12 having a swivel connection 12' with the back frame 8' of the prism, the ball and socket being held together by spring 9. The adjustment about the longitudinal axis for the offset angle or deflection is shown as effected through an arm 13 secured to the back 14 of ring 10 (see Figs. 2 and 6). The line of sight from the ground enters through the window 14' and is reflected by the prism 8 to a second fixed prism 15 which directs the image along a vertical line through the objective lenses 16 which focus the image on the reticule 3.

Preferably we incorporate in the sight a means for quickly and accurately determining the correct drift angle. For this purpose we have shown an auxiliary drift prism 17 or other double reflector slidably mounted between the prism 15 and the lenses 16. Said drift prism is normally pushed out of this line of sight by means of the handle 18 pivoted at 19 and having segmental teeth 20 thereon meshing with rack teeth 21 on the framework carrying the prism which is slidably mounted on trackway 22. When it is desired to ascertain the drift, however, the handle 18 is moved to the position shown in dotted lines in Fig. 6, pushing the prism 17 to the left into the full line position whereby by double reflection, the image of the ground lying vertically below the craft as seen through the window 23 is reflected up through the lenses 16 to the reticule. The bomber, in looking through the telescope, then sees objects on the ground passing across the optical field. As the motion of these objects in relation to the reticule is caused only by the forward motion of the plane over the earth, the roll and pitch of the plane being taken out by the stabilized reticule, the direction of motion across the field is parallel to the ground course the plane is flying. Therefore, if the sight as a whole is turned until the objects in the field of view move along or parallel to the fore and aft hair 5 on the reticule, then the sight will be pointed in the direction of the ground course or, in other words, the correct drift angle for that particular course will be set into the bomb sight. This is accomplished by rotating the handle A at the front of the instrument (Figs. 1 and 2) which turns shaft 25 and thereby rotates vertical shaft 26 through worm 27 and wormwheel 28. Shaft 26 is shown as having thereon a drift dial D and as carrying a pinion 29 meshing with a fixed gear 30 at the base of the device so that rotation of the handwheel A rotates the base 129 and the entire casing 1 in azimuth around said gear 30. After obtaining the correct drift angle, the prism 17 is moved out of the way by moving handle 18 to the left in Fig. 6. In actual operation, the bomber may keep prism 17 at an intermediate position where it intercepts only a part of the field of view. In such case, by shifting his eye from the forward to the rearward line of sight through the telescope, he may see either the distant target or the ground beneath the plane at will or almost simultaneously. The apparent ground speed may then be set up through handle GS by which an automatic means is set into motion which causes the prism to remain on the target as the craft flies toward it, as hereinafter described.

Figures 6, 6A, 7, 8, 8A:
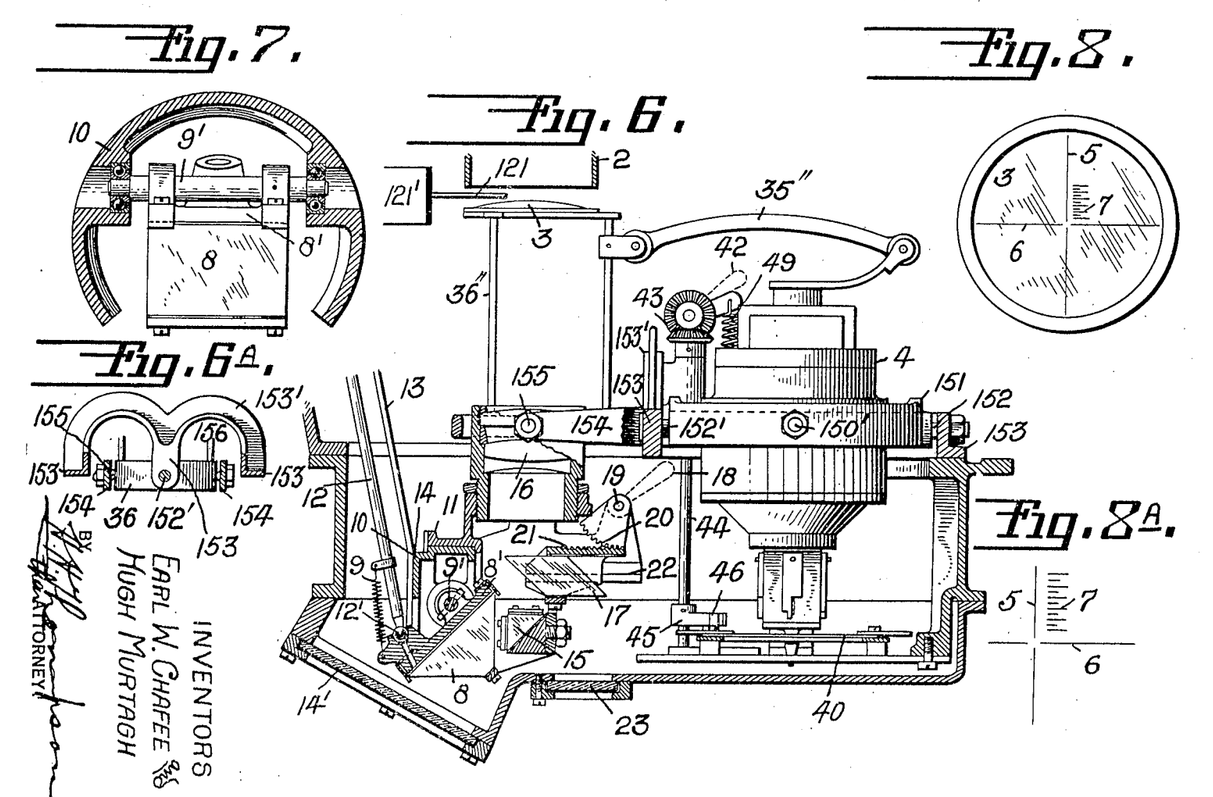
Fig. 6 is a side elevation, partly in section, of the principal portion of the optical unit together with the stabilizing or baseline gyroscope.
Fig. 6A is an end view, partly in section, of the supporting frame for the gyroscope and reticule unit.
Fig. 7 is a sectional detail of the support for the main prism or other reflector used for sighting the target.
Fig. 8 is a plan view of the stabilized sighting reticule.
Fig. 8A is an enlarged detail of the central portion of the reticule.

Preferably the reticule is stabilized from a gyro vertical (Fig. 6) which is shown as a universally mounted gyroscope having the top thereof connected by linkage 35'' to a gimbaled framework 36'' so that the reticule 3 is stabilized in both planes which, in effect, stabilizes the optical system. The gyroscope 4 is shown as mounted for oscillation about a transverse axis 150' in an outer gimbal ring 151 which in turn is mounted for oscillation about a fore and aft axis on trunnions 152, 152' in fixed frame 153. Said gimbal is provided with forwardly extending arms 154 which support the frame 36'' on transverse axis 155, so that a common gimbal is provided for both the gyroscope and reticule frame. Where the arms 154 pass under the cross bar 153' on frame 153, the bar is bent upwardly to furnish sufficient clearance for the bars to oscillate about main gimbal axis 152, 152' (Fig. 6A).

Figure 9:
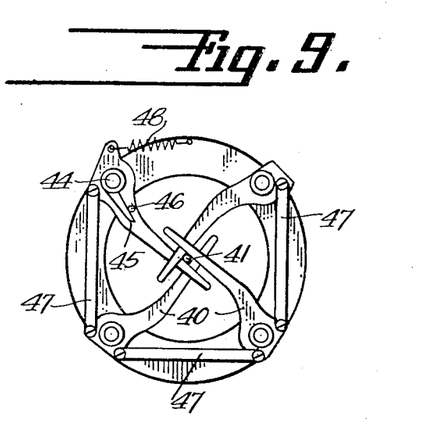
Fig. 9 is a bottom plan view of the gyroscope showing the locking or caging mechanism therefor.
Figure 10:
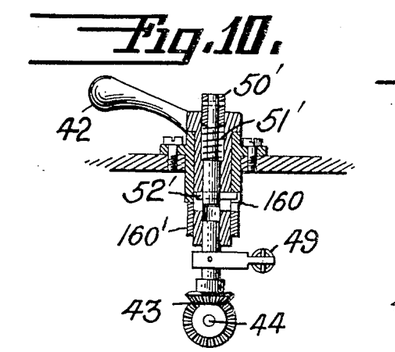
Fig. 10 is a detail showing the quick release for the locking mechanism.

The gyroscope is preferably locked until the sight is thrown into operation by means of locking or caging fingers 40 pivoted around the base thereof (Fig. 9). Said fingers are equally spaced around the gyroscope and bear at their inner ends against pin 41 projecting downwardly from the gyro casing. Said fingers are all operated simultaneously from a caging handle 42 (Figs. 6 and 10) operating through bevel gears 43 and a vertical shaft 44 which has secured adjacent its lower end a finger 45 which bears against a pin 46 on one of locking fingers 40. The several arms are connected by cross links 47 and are normally held open by a tension spring 48 (Fig.

9). When handle 42 is rotated, however, in the proper direction, the finger 45 pressing against pin 46 closes the locking fingers and thus cages the gyroscope, the handle being held in this position by the engagement of a cross pin 52' in a notch 160 in fixed sleeve 160'. In order not to disturb the gyroscope in the process, it is highly desirable that all fingers be released simultaneously and quickly and for this purpose we have provided a quick release button 50' slidably mounted at the center of the handle 42. This button, which is normally pressed outwardly by spring 51', if pushed inwardly releases the cross pin 52' from notch 160, thus permitting the springs 48 and 49 to snap the fingers open.

Figure 12:
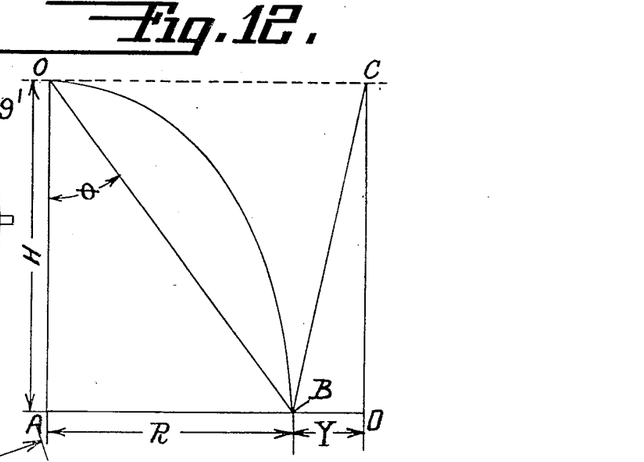
Figs. 12 and 13 are diagrams illustrating the general theory of operation of the sighting and calculating mechanisms, Fig. 12 being an elevation and Fig. 13 a plan view of the vectors involved.
Figure 13:
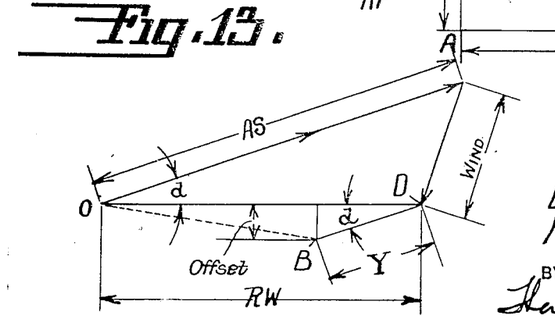

The computing unit may be best understood by first describing the general mathematical principles involved as shown in Figs. 12 and 13. The vertical leg of the range triangle AOB represents the altitude (H) and the horizontal leg AB represents what may be termed true range distance, i. e., the horizontal projected distance of the aircraft from the target when the aircraft is at position O. Point D represents the point at which the bomb would hit the ground if released at O and there were no air resistance. The whole range distance then, i. e. AD, equals the ground speed multiplied by the actual time of fall of the bomb or $$GS \times T = R_w$$

where
  GS = the ground speed.
  T = time of fall.
  $R_w$ = the whole range.

The true range then (R) is equal to the whole range minus the trail distance $$(GS \times T) - Y = R$$

where
  Y = the trail distance.
From Fig. 12 then $$\tan \theta = \frac{R}{H}$$

where $\theta$ = the range angle, and substituting the values given above $$\tan \theta = \frac{(GS \times T) - Y}{H} \text{ or } \frac{R_w - Y}{H}$$

This expression may be written as follows by dividing both the numerator and denominator by T so that the expression becomes I. $$\tan \theta = \frac{GS - \frac{Y}{T}}{\frac{H}{T}} \text{ or } \frac{\frac{GS}{H} - \frac{Y}{HT}}{\frac{1}{T}}$$

This equation may also be written

IA. $$\tan \theta = \frac{V_H - R_H}{V_v} \text{ or } \frac{V_H - R_H}{\frac{1}{T}}$$

where $V_H$ represents the horizontal component of the rate of movement of the line of sight in following the target, $R_H$ represents the average rate of horizontal retardation of the bomb due to air resistance, and $V_v$ represents the average rate of fall of the bomb. This equation, it should be noted, deals in rates only and is independent of ground distances or actual ground speeds and does not contain either air speed or altitude, as such.

Equation IA fits readily into our sight for the reason that ground speed, as such, is not obtained directly but only the horizontal component of the rate of movement of the line of sight ($V_H$). In the prior art an attempt was always made to convert such rate into ground speed by multiplying the same by the proper function of the altitude. If the altitude readings were in error, large errors were thus introduced. In our sight, on the other hand, we design the sight so that for unit altitude (say one mile or 5000 ft.) the horizontal component of the rate of movement of the sight is taken as the ground speed, while for all other altitudes the apparent ground speed would be inversely proportional to the altitude, which we take into account not by altering the indicated rate ($V_H$), but by multiplying both numerator and denominator by $$\frac{1}{T}$$

thus introducing altitude only in the expression $V_v$ or average rate of fall of the bomb and in computing the proportional $R_H$. Experimentally, it has been determined that $V_v$ varies very slowly with altitude changes so that errors in obtaining altitude affect the accuracy of the sight very little. Viewed from another standpoint, the average range triangle is small so that the vertical side is much longer than the base. Therefore, a given error on the vertical side will cause much less error in computing the range angle than the same error on the short side of the triangle.

Referring now to Fig. 13, it will be seen that for cross wind bombing the trail is always calculated along a line parallel to the air speed line and of a length proportional to air speed. In other words, the bomb will fall down wind from the ground speed course a distance called the offset) equal to the trail times the sine of $d$ where $d$ equals the drift angle.

Letting $a$ equal the offset angle, that is to say, the angle between the vertical plane containing the ground course AD and an inclined plane containing the offset line A'B on the ground and intersecting said vertical plane along a line containing the point O, which is the point of release, it may be stated that $$\tan a = \frac{Y}{H} \sin d$$

or since, approximately, $$Y = \frac{A_s}{c'}$$

where $c'$ is a constant, and $A_s$ is the air speed of the airplane, we may write $$\tan a = \frac{A_s \sin d}{Hc'}$$

or for unit altitude,

II. $$\tan a = \frac{A_s \sin d}{c'}$$

It is found that over the ranges of values of air-speed, terminal velocity, and altitude that are liable to occur in practice, it is a good approximation to assume that for any given bomb $$Y = \frac{A_s \cdot H}{C'}$$

where $C'$ is a constant for the particular type of bomb. This constant $C'$ depends on the terminal velocity TV of the bomb, and is approximately proportional to it so that we can write $C'$ is equal to $C \cdot TV$.

From the above equations we derive, as a sufficiently close approximation, the relation $$\tan a = \frac{A_s \cdot \sin d}{TV \cdot C}$$

The computing mechanism is so designed that the range angle ($\theta$) is set up automatically by setting in the correct combination of altitude (H), air speed ($A_s$), component prism speed (GS), and type of bomb ($T_v$).

The range arm (Fig. 3) consists of a slotted lever 50 having a hub or sleeve 51 loosely mounted on shaft 52. On said hub is also mounted one 53 of a pair of contact arms 53 and 54, each having an upper bent portion 53' and 54', respectively, which may be seen through a window 55' in the top of the box 1. The free end of said lever 50 is positioned by a block 55 slidably mounted in the slot 56 in said lever. Said block has a pin 57 projecting on each side thereof, said pin engaging in front a slot 58 in a vertically movable horizontal bar 59. At the opposite end said pin engages a vertical slot 60 in a horizontally movable vertical bar 61. Bar 59 may be moved vertically in accordance with the vertical velocity of the bomb from a threaded shaft (or shafts) 62 which is rotated through bevel gears 63 from shaft 164 of altitude handle wheel H in accordance with the altitude as set on dial 66 which is turned therefrom through pinion 65. Slotted bar 61, on the other hand, is moved laterally by the rotation of a threaded shaft 67 which is positioned by the handle GS in accordance with the apparent ground speed.

Figure 3:
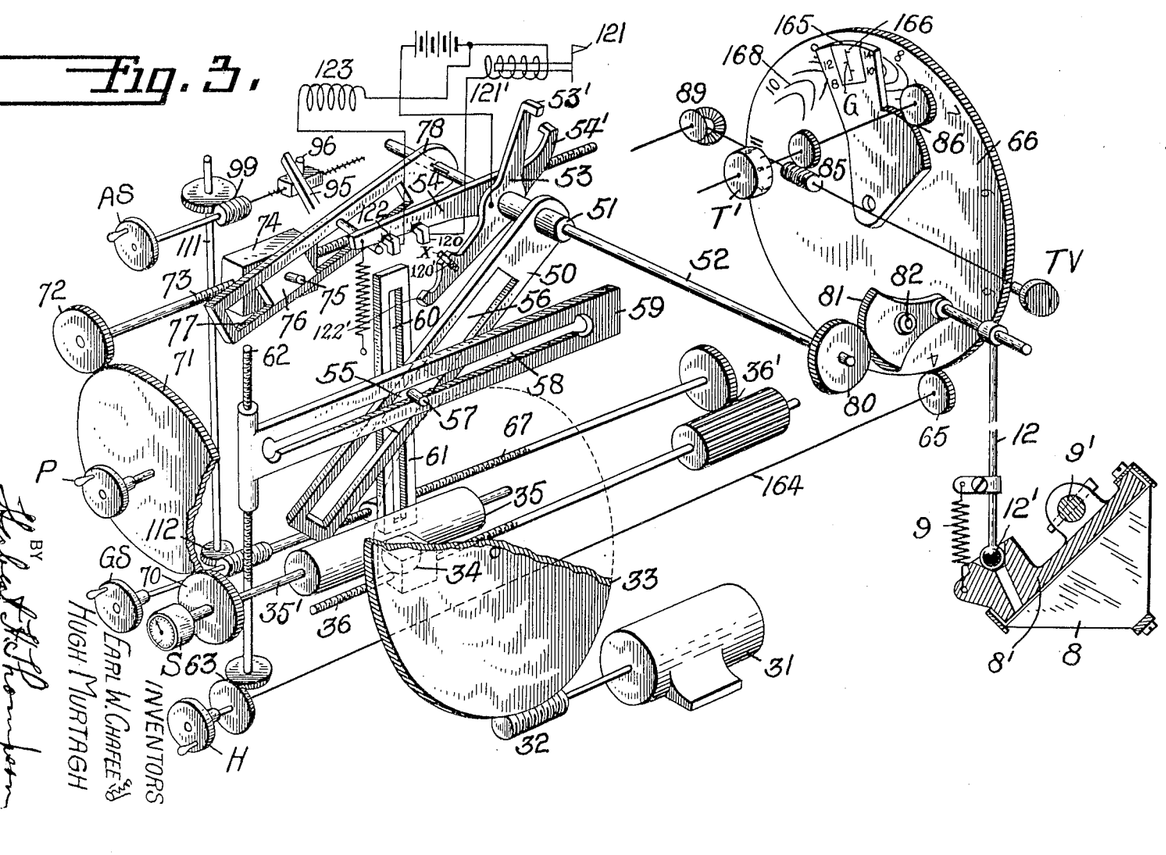
Fig. 3 is a diagrammatic perspective view of the calculating mechanism from which, however, the off-set unit and the trail unit are partially omitted.

For this purpose we provide a variable speed drive actuated from a constant speed motor 31 which drives through suitable gearing 32 a disc 33 (Fig. 3). Bearing on said disc is a change speed ball (or balls) 34 which is placed between said disc and a cylinder 35 and is adjustable axially along the cylinder and radially of the disc by means of a threaded shaft 36. The rate of rotation of shaft 35' is, therefore, proportional to the apparent ground speed and a speed indicator S may, therefore, be placed on this shaft to show ground speed for a predetermined altitude by which the device may be checked. The trial setting of the change speed device is effected through the handwheel GS on the instrument, which is shown as mounted on shaft 67 which is geared to threaded shaft 36 through gearing 36'. Turning of handwheel GS also automatically sets up in the computing mechanism the correct angular rate of prism speed by positioning bar 61 laterally through threaded shaft 67. Also, the variable speed device actually turns the prism 8 at a rate to keep it on the target through gear 70 on the shaft 35' of cylinder 35, large gear 71, gear 72 and other mechanism hereinafter described, the target having been initially sighted by turning target pick-up handle P on gear 71.

On a screw 73 is threaded a block 74 carrying a pin 75 which engages a hole in block 76 slidably mounted in a slot 77 in arm 78 so that said arm is turned at the same angular rate as the line of sight when the correct apparent ground speed has been set up and the sight is on the target. This arm is secured to the shaft 52 which turns through suitable gearing 80 a gear sector 81 pivoted at 82 and linked to the prism 8 through the above described rod 12, thus setting and keeping the line of sight on the target after having been set thereon by prism pick-up handle P and the proper apparent ground speed having been set in. While prior sights usually interpose a differential between the prism pick-up handle P and the change speed gearing 33—35, we prefer not to do so, the handle P, when operated, merely slipping the variable speed gear. By this we eliminate a large source of error in prior sights due to unavoidable lost motion or backlash in all differentials.

Arm 78 above described also positions contact arm 54 above described, both arms being on the common shaft 52. Arm 54 is, therefore, advanced toward arm 53 (positioned at the range angle ($\theta$) as the target is approached until contacts 120 and 122 thereon successively engage their complemental contacts 120' and 122' on arm 53 to give a warning signal 121 and drop the bomb (or signal to do so) through solenoids 121' and 123. To insure this sequence, contact 120' may have a spring pressed pin X projecting therefrom. Preferably signal 121 is in the form of a miniature flag (Fig. 6) which is projected into the line of sight of telescope 2 by solenoid 121'. Since arm 78 is always maintained at the sight angle and arm 54 is on the shaft 52 thereof, the position of end 54' in curved window 55' may be used as an indicator of the sight angle or angular speed. For a given angular speed, however, the corresponding ground speed varies not only with altitude but with a function of the instantaneous sight angle. By having a non-uniform scale 180 on window 55' on which index 54' is readable and by bearing in mind his altitude (H), the bomber may obtain a ready estimate of the horizontal component of his velocity (GS) and ground distances.

Figures 4, 5:
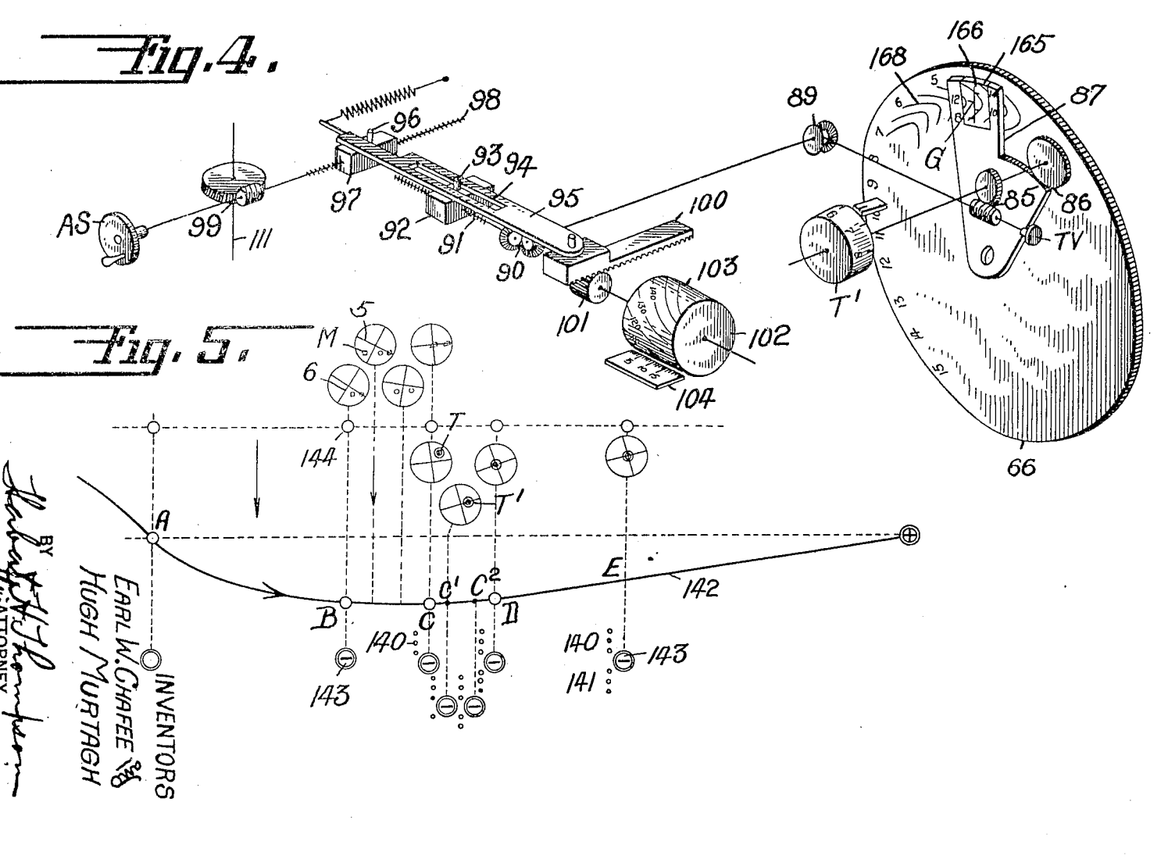
Fig. 4 is a diagrammatic perspective view of the aforesaid trail unit portion of the calculating mechanism.
Fig. 5 is a diagram showing the method of arriving at a straight ground track intersecting the target according to our invention.

The trail unit portion of the device is shown diagrammatically in Fig. 4. In this unit are introduced a terminal velocity of fall of the bomb through the handle TV which is set in accordance with the known characteristics of the bomb in accordance with the readings on dial T', while indicated air speed is set into the unit from the handle AS. Turning of the handle TV rotates through suitable gearing 85 and 86 a sector 87 with respect to the altitude dial 66. Said sector has a window 165 therein having a central vertical cross hair 166 and graduations G spaced vertically in accordance with a function of known terminal velocities for different types of bombs. The dial 66 is also graduated with curved and non-uniformly spaced altitude curved lines 168 and after the sector 87 is set from handle TV so that the dial T' indicates the required terminal velocity (in hundreds of feet per second), the handle H is turned until the known altitude is indicated by reading the proper altitude curve against the proper terminal velocity mark G on the vertical cross hair 166. By this means the factor T (time of fall) of Equation I is introduced into the calculating mechanism along with H. Thus bar 59 is positioned in accordance with $V_v$ of Equation I. This is one respect in which our improved sight differs from the prior art in which a second variable speed device (in addition to the one for apparent ground speed) was used to compensate for the fact that the rate of movement of the line of sight varies with the altitude. Such a device, when used at great altitudes, multiplies the errors. In our device only one variable speed device is used, the variations due to altitude being taken care of by the proper spacing of the altitude markings 168 on dial 66.

Said handwheel TV also rotates through suitable gearing 89 and 90 a threaded shaft 91 on which is threaded a block 92 carrying a pin 93 so that as said shaft 91 is rotated the pin is adjusted along a slot 94 in a lever 95 and acts as a variable fulcrum therefor. The far end of said lever is shown as bearing against a pin 96 on a second block 97 threaded on a shaft 98 which is turned from the air speed setting handle AS. The opposite end of said lever is shown as pivotally secured to a rack bar 100, the teeth of which mesh with a pinion 101 on the shaft of the trail drum 102. On said drum are plotted indicated air speed curves 103 in miles per hour (for instance) which curves are readable on an altitude scale 104 running lengthwise of the drum. Therefore, after the proper value of TV has been set in on drum T', if the proper indicated air speed is set on the drum 102 by turning handle AS against the known altitude H on the scale, the rotation of handle wheel AS will put the rate of horizontal retardation (RH) of the bomb into the screw 67 by the gearing 99, shaft 111 and rack and pinion gearing 112 connecting handle AS and screw 67. Thus bar 61 is positioned in accordance with VH—RH of Equation I.

Figures 1, 1A, 2:
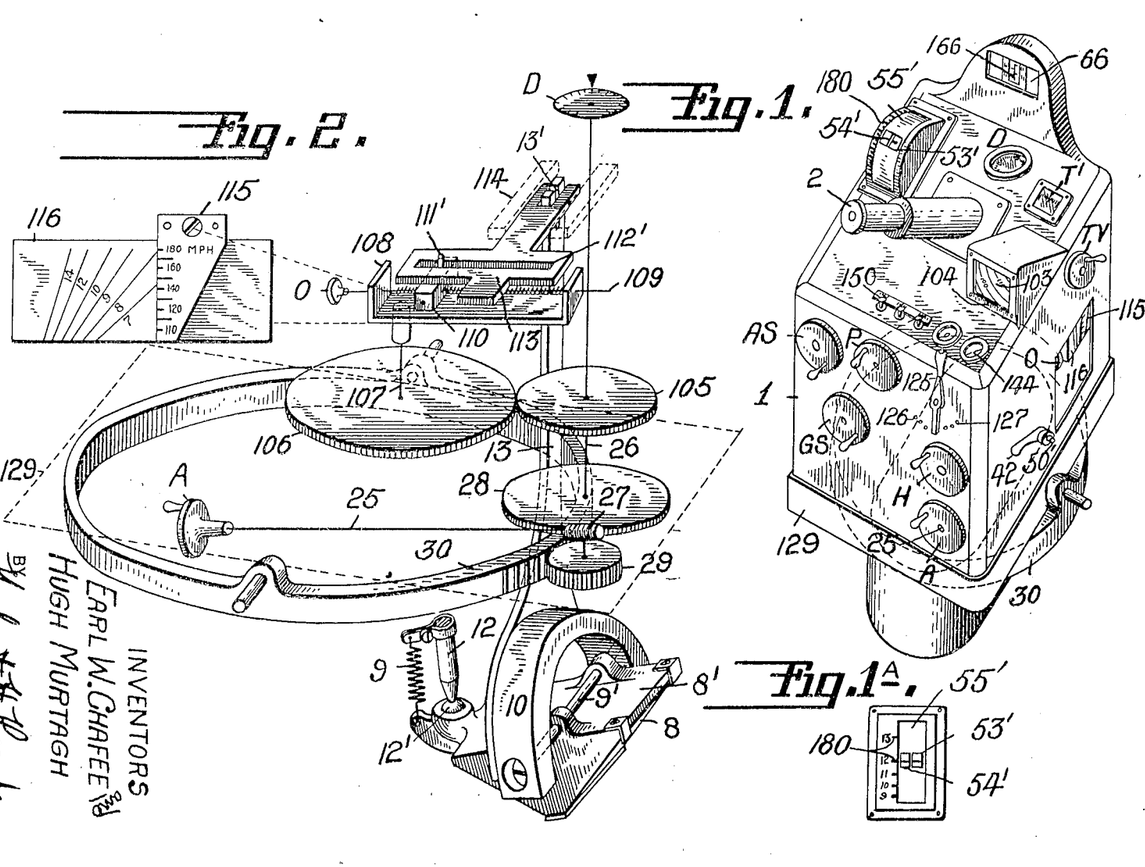
Fig. 1 is a perspective view of the exterior of our complete bomb sight.
Fig. 1A is a detail of the range angle and sight angle indicator.
Fig. 2 is a diagrammatic perspective view of one of the units or parts of the calculating mechanism referred to hereinafter as the offset unit.

The offset unit is primarily actuated from the rotation of the sight as a whole in azimuth. When this occurs the shaft 26 above described is rotated, thus rotating through the gear 105 a large gear 106. Mounted eccentrically on the shaft 107 of said gear is a U-shaped member 108 forming part of the calculating mechanism and which is, therefore, rotated through an angle equal to the drift angle. In said member 108 is journaled a threaded shaft 109 which is set from a handle or knob O. On said shaft is threaded a block 110 carrying a pin 111' which engages a slot 112' in a T-shaped slide 113. Said slide is slidably mounted in framework 114. Rotation of the member 108 about the center of shaft 107, therefore, will move the slide 113 longitudinally in accordance with the distance of the pin 111' from the center of shaft 107 and also in accordance with the sine of the drift angle. Mounted on block 110 is a scale 115 in speed units, such as miles per hour, while mounted on member 108 is a scale 116 graduated to represent the ballistic coefficient of the bomb, i. e., terminal velocity TV. Therefore, by setting the handle O to the proper readings on scales 115 and 116, i. e. actual air speed and terminal bomb velocity, there is introduced the element $$\frac{A_s}{T_v \times c'}$$

of Equation II, while the factor sin $d$ is introduced automatically by positioning the sight in azimuth, which rotates the member 108 about the center 107. Therefore, the movement of slide 113 is proportional to a function of the offset angle $a$, and this movement is transmitted to the lever 13 at the pin and slot connection 13', said lever 13 being secured to the mirror 8 to tilt the same laterally for setting up the proper offset angle or deflection.

The operation of the computing portion of our device is as follows: The bomber usually sets in first the terminal velocity of the bomb through rotating the handwheel Tv until the dial T' indicates the proper terminal velocity for the type of bomb employed as shown by tables furnished the bomber. This also positions the fulcrum 93 of the multiplying lever 95 and moves the pointer or arm 87 on the altitude dial 66. At the same time the handwheel O is actuated to set the proper value of actual air speed with reference to Tv on scale 116. Next, the altitude is preferably set in by turning handwheel H until the dial 66 indicates the correct altitude as the altitude marks 168 are read against the vertical graduations G for TV. This operation turns the threaded shaft 62, thus positioning the pin 57 vertically for the values of $$V_v \text{ or } \frac{1}{T}$$

Turning the air speed handwheel As revolves the horizontal screw 67 as described, thus positioning the pin 57 horizontally in accordance with $$\frac{Y}{HT}$$

At the same time the far end of the trail lever 95 is moved, causing the trail drum 102 to rotate, the curves of which are corrected for variations between true and indicated air speed and for Tv. By matching the proper air speed curve on the drum with the correct altitude on the flat scale 104, the vertical shaft 111 rotates the horizontal screw 67 through rack and pinion gear 117 a distance equal to the average rate of horizontal retardation of the bomb $$\frac{R_H}{H} \text{ or } \frac{Y}{T}$$

The apparent ground speed is obtained by moving the variable speed ball 34 by turning handle GS until the angular velocity of the line of sight matches the speed of the plane. This sets the ball at a distance from the center of the disc 33 proportional to the velocity of rotation of the prism. As the horizontal screw 67 of the range arm mechanism is directly connected to the ground speed screw 36 of the variable speed drive through gearing 36', the slider 55 on the range arm 50 will also be set horizontally for $$\frac{GS}{H} \text{ (or } AGS\text{)}$$

However, the screw 67 having already been moved a distance $$\frac{Y}{HT}$$

by setting in air speed, the pin 57 will be positioned for the value of the $$\frac{GS}{H}$$

minus the horizontal retardation rate, or $$\frac{GS}{H} - \frac{Y}{HT}$$

It should be noted that although we have retained the three primary settings of altitude, air speed, and a function of ground speed, we have laid the greatest mechanical responsibility on that particular setting which can be determined the most accurately. In bomb sights, the altitude setting consists of the reading given by an altimeter which has varying errors and, therefore, the altitude so obtained is not very accurate. The same applies to the air speed settings and if ground speed, proper, is used (as in most bomb sights) it also is often erroneous as it has to be multiplied by the altitude factor. In our system, on the other hand, we use only the horizontal component of the angular travel of a prism, which is held on a definite object on the ground in which there can be no error other than due to this setting and reading, and being an optical device is very accurate. We make, therefore, this setting the basic factor of the settings so that the errors caused by the other settings can only be of fractional proportions. As far as the range angle is concerned, if the bomb were dropped in vacuum this horizontal rate would be the entire travel of the bomb and the altitude would enter only once in the velocity of fall of the bomb.

The above settings, therefore, will position the range arm at the correct range angle or $\theta$, thereby positioning the contact arm 53 at the same angle. The cooperating contact arm 54 is positioned by the position of the prism arm 78, which in turn is positioned from the variable speed drive through block 74 and the screw 73 as described. As the angle of the line of sight approaches the range angle, first the warning contacts 120—120' are engaged, showing a flag 121 in the telescope 2 by exciting solenoid 121' and lighting the external lamp 144. As the proper range angle is reached, the second pair of contacts 122—122' are engaged either sending a signal to the bomber or operating the solenoid 123 to release the bomb or both.

Since, however, there is always a slight delay between the actual crossing of the range angle and the release of the bomb, we prefer to provide a means for presetting the bomb to allow for this delay. Such a means preferably consists of the above described presetting scale 7 engraved on the reticule 3. Each scale division has a value of a predetermined unit of distance, such as 10 ft. at 1000 ft. altitude at an average range angle. Therefore, in order to obtain the value of the divisions at any other altitude, it is necessary mentally to multiply 10 by the first one or two figures of the particular altitude (H). For instance, the value of each division at 5000 ft. would be 50 ft. and at 15,000 ft. would be 150 ft. To preset the line of sight any given amount, it is necessary to set the target on a predetermined line on scale 7 instead of on the cross hair 6.

By special design of the reticule, we also are enabled to use the sight as a means of furnishing the aviator with an estimate of the size of the objects and the distance between objects on the ground. To this end the cross hairs 5 and 6 stop short of the point of intersection between the same at an equal distance from such point (see Fig. 8A). Preferably the distance between the adjacent ends of each cross hair is equal to the space between the major graduations on scale 7. Therefore, if each major division represents 100 ft. at 10,000 ft. altitude, a building whose image occupied a space between said two adjacent ends, would indicate to the aviator that its length was 100 ft. if at that altitude.

Figure 11:
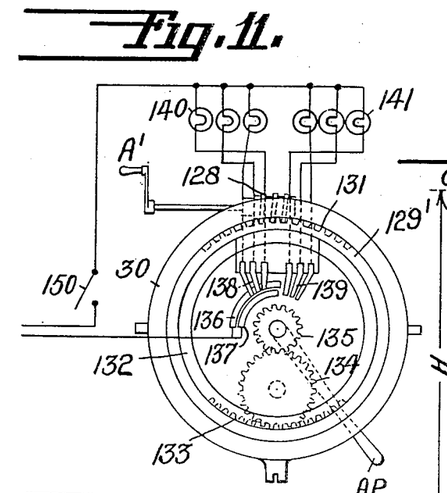
Fig. 11 is a diagrammatic view showing a modified form of the invention in which the signals to the pilot are transmitted automatically from the bomb sight itself.

Referring now to the pilot directing portion of our invention, the bomber signals the pilot as to the course desired by means of a manually operated switch 125 (Fig. 1), which has a plurality of contacts 126—127 on either side thereof to indicate or control the degree of turn desired. If desired, the turning signals may be given automatically from the bomb sight. This form of the invention is illustrated diagrammatically in Fig. 11. According to this form, the fixed base ring is shown at 30, the same being provided with a worm 128 turned from the handle A' to rotate the platform 129 which carries the bombsight, said worm meshing with worm teeth 131 on the ring 129' on platform 129. In this case, however, we provide within the ring 129' an auxiliary platform 132 which is rotatably adjustable on or within ring 129'. Said ring 129' is shown as provided with internal teeth 133 with which meshes a gear 134 journaled on the platform 132. Meshing with gear 134 is a pinion 135 which may be rotated from the azimuth pick-up handle AP. Also on platform 132 are concentric segmental contacts 136 and 137 with which contact fingers 138 and 139, mounted on ring 129', are adapted to contact. Each finger is in circuit with one of the signal lamps 140 or 141 mounted adjacent the pilot, preferably adjacent the directional gyroscope 143 by which the pilot steers (Fig. 5). Normally the handle AP is in a position so that all the lamps are lighted (if switch 150 is closed) with handle AP vertical (in Fig. 11) and the contacts symmetrically positioned, but if said handle be turned in one direction (for instance to the position shown in Fig. 11), first one and then the other of the lamps 141 are extinguished, or if turned in the other direction, first one and then the other of lamps 140 are put out. It will also be apparent that turning of the handle A' for setting up the proper drift angle does not affect the lights and also that the turning of the handle AP will not permanently disturb the correct drift setting because in operation the handle AP is always brought back to its initial or vertical position before the bomb is dropped.

The operation of our invention may be understood by describing a typical target approach. In Fig. 5, line 142 shows diagrammatically the ground course of the airplane approaching the target and the circles beneath the line illustrate the signals sent to the pilot beside the directional gyroscope 143. The parts above the line represent the appearance of the field as seen through the telescope when setting the drift and when sighting on the target. At the point A, the pilot sights the target and starts to fly toward it. During the time of flight between A and B, he sets up his drift as well as possible, trying to put the ground course of the plane straight through the target. Assuming he has the ground course approximately through the target at the point B, that is, within plus or minus 5 degrees, he then flies straight by means of his directional gyroscope 143 and closes a switch (not shown) to light the bomber's signal lamp 144. The bomber, upon getting the signal, moves the prism 17 into the line of sight and then turns the azimuth control handle A until any sighted object M on the ground passes across the field of the telescope parallel with the fore and aft line 5 of the reticule. This operation is taking place between the points B and C, and at point C the correct drift has been obtained. The bomber then closes the switch 150 (Fig. 11) to light the signal lamps 140, 141 at the directional gyro. At this time also the bomber moves the prism 17 out of the line of sight and turns the prism handwheel P until he sees the target. The target will be somewhere in the field but off the reticule wires as indicated by the point T in Fig. 5. The bomber then signals the pilot to turn either by moving the switch 125 in Fig. 1 to the right or left or in the form shown in Fig. 11 by turning the handle AP which brings the line of sight on to the target as shown at T₁, position C' and also puts out the lights 141 (point C), thus signalling the pilot to turn rapidly. The pilot then puts the ship into a fast turn and continues turning at that rate until the outer lamp lights when he slows down the rate of turn (C'). The bomber, in keeping the reticule on the target, keeps turning the pick-up handle AP in the opposite direction from the original movement (C²) until finally the ship has been brought around to the proper course (D), the target is at the exact center of the cross hairs and all lights are lighted, the original drift setting remaining undisturbed. During the time from C to D, while the bomber was holding the reticule on the target he is also synchronizing the ground speed by adusting handle GS. Therefore, he arrives at the point D at the correct ground speed set in the bomb sight and flying on the desired straight ground track directly toward the target (neglecting the offset or deflection). From this point D, to point E, where the bomb is released, the pilot maintains the ground course through the target both by watching his directional gyroscope and the signal lights which are operated automatically from the bomb sight in the form of the invention shown in Fig. 11 or from handle 125 in the form shown in Fig. 1, the bomber in effect directing the plane to maintain its straight ground track until the bomb is released.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a bomb sight for aircraft, a pivotally mounted reflector to sight and follow a remote target as it is approached, an independently mounted reticule on which the ground image from said reflector is focused, a gyroscope connected to said reticule to stabilize the same against rolling and pitching of the craft, and a slidably mounted auxiliary reflector adapted to direct an image of the ground vertically below the craft onto said reticule in one position and to lie entirely out of the field of vision of said sight in its other position.

2. In a bomb sight for aircraft, a pivotally mounted reflector to sight and follow a remote target as it is approached, an independently mounted reticule on which the ground image from said reflector is focused, a gyroscope connected to said reticule to stabilize the same against rolling and pitching of the craft, an auxiliary reflector adapted when in operative position to direct an image of the ground vertically below the craft onto said reticule and movably mounted between said reticule and the ground, and means for moving said auxiliary reflector into and out of the line of sight between the first named reflector and the reticule.

3. In a bomb sight for aircraft, a pivotally mounted reflector to sight and follow a remote target as it is approached, a reticule on which the ground image from said reflector is focused, means for stabilizing said reticule against rolling and pitching of the craft, a movable auxiliary reflector adapted in one position to direct an image of the ground vertically below the craft onto said reticule and in another position to lie without the field of vision, means for rotating the sight as a whole about its vertical axis to align the sight and the ground course, and means actuated thereby for adjusting said pivoted reflector to set the drift angle into the sight.

4. In a bomb sight for aircraft, a sight-directing member, means for mounting said member for turning about a vertical axis, means for mounting said member for adjustment about both the fore and aft axis of the sight, and an axis at right angles thereto, and means actuated by the turning of said member about its vertical axis for adjusting said member about said fore and aft axis to give said member the proper offset angle to compensate for the drift, including a pin rotated about a center in accordance with adjustment of said member about its vertical axis, means for varying the position of said pin in accordance with a function of air speed and bomb characteristics including a fixed scale and a cooperating scale mounted to move with said pin, one of which is graduated in air speed and the other in bomb characteristics, and a member positioned by one component of the movement of said pin for tilting said sight directing member about its fore and aft axis.

5. In a bomb sight, a stabilized reticule, cross hairs thereon interrupted at predetermined points adjacent the virtual point of intersection of said hairs, and a graduated scale adjacent one of said hairs, the spacing of said graduations having a predetermined relationship to the space between the adjacent ends of said cross hairs and to the size of an object on the ground at a predetermined altitude whereby the size of objects on the ground may be estimated.

6. In a bomb sight, a rotatable indicating member, means for moving the same at the same angular speed as the line of sight moves in following the target, a second rotatable member positioned at the range angle and a scale on which both members are readable in which the graduations are nonuniformly spaced to compensate for the variations between actual and apparent ground speed with changes in the sight angle.

7. A bomb sight for aircraft including a sight directing member, dual means for mounting the sight for turning about a vertical axis, comprising means for turning said sight parallel to the ground course to obtain the drift angle, and additional means for temporarily turning said sight to bring the target on the sight cross hairs, means operated only by said second named means for turning said sight member through the offset or deflection angle to compensate for side drift, and means operated only by said third means for indicating that a turn should be made.

8. In a bomb sight, a sight-directing member mounted for turning about a normally vertical axis and about the fore and aft axis of the sight and transversely thereof, means for turning said member about said vertical and transverse axes, means for varying the offset angle of said member about said fore and aft axis as said member is adjusted about its vertical axis in accordance with a function of the sight angle about said transverse axis, independent means for adjusting said sight member about its vertical axis without so affecting said offset angle, and means operated by said last named means for indicating that a turn should be made.

9. A bomb sight for aircraft, including a reflector, dual means for mounting the sight for turning about a vertical axis, means for rotating said reflector about another axis to compensate for side drift, means operated by one of said dual means for actuating said second mentioned means to rotate said reflector through the offset angle to compensate for side drift, and means operated by the other of said dual means, indicating that the craft should be turned without disturbing the setting of said reflector.

10. In a bomb sight, an altitude dial, means for setting said dial, said dial being provided with non-uniformly spaced altitude graduations thereon corresponding to the average rate of fall of different types of bombs from the indicated altitudes, a movable index device on which said dial is readable, means for setting said index device in accordance with the terminal velocity of the type of bomb used, a range angle bar, horizontal and vertical component means for positioning said bar, said horizontal component means serving to position said range bar in accordance with the ground speed of the aircraft, said vertical component means serving to position said range bar in accordance with the rate of fall of the bomb, and means interconnecting said dial setting means and said vertical component means for positioning the latter means simultaneously with the setting of said dial.

11. A bomb sight as claimed in claim 10, wherein said movable index device has radially spaced terminal velocity graduations upon which the graduations on the dial are read.

EARL W. CHAFEE.
HUGH MURTAGH.